May 12, 1970     J. RUGEL     3,511,175
PRESS STRUCTURE
Filed Oct. 16, 1968     3 Sheets-Sheet 1

INVENTOR.
JOSEPH RUGEL.
BY
Willard S. Goen
ATTORNEY.

May 12, 1970

J. RUGEL 3,511,175

PRESS STRUCTURE

Filed Oct. 16, 1968

INVENTOR
JOSEPH RUGEL.

Willard S. Ground
ATTORNEY.

May 12, 1970     J. RUGEL     3,511,175
PRESS STRUCTURE
Filed Oct. 16, 1968     3 Sheets-Sheet 3
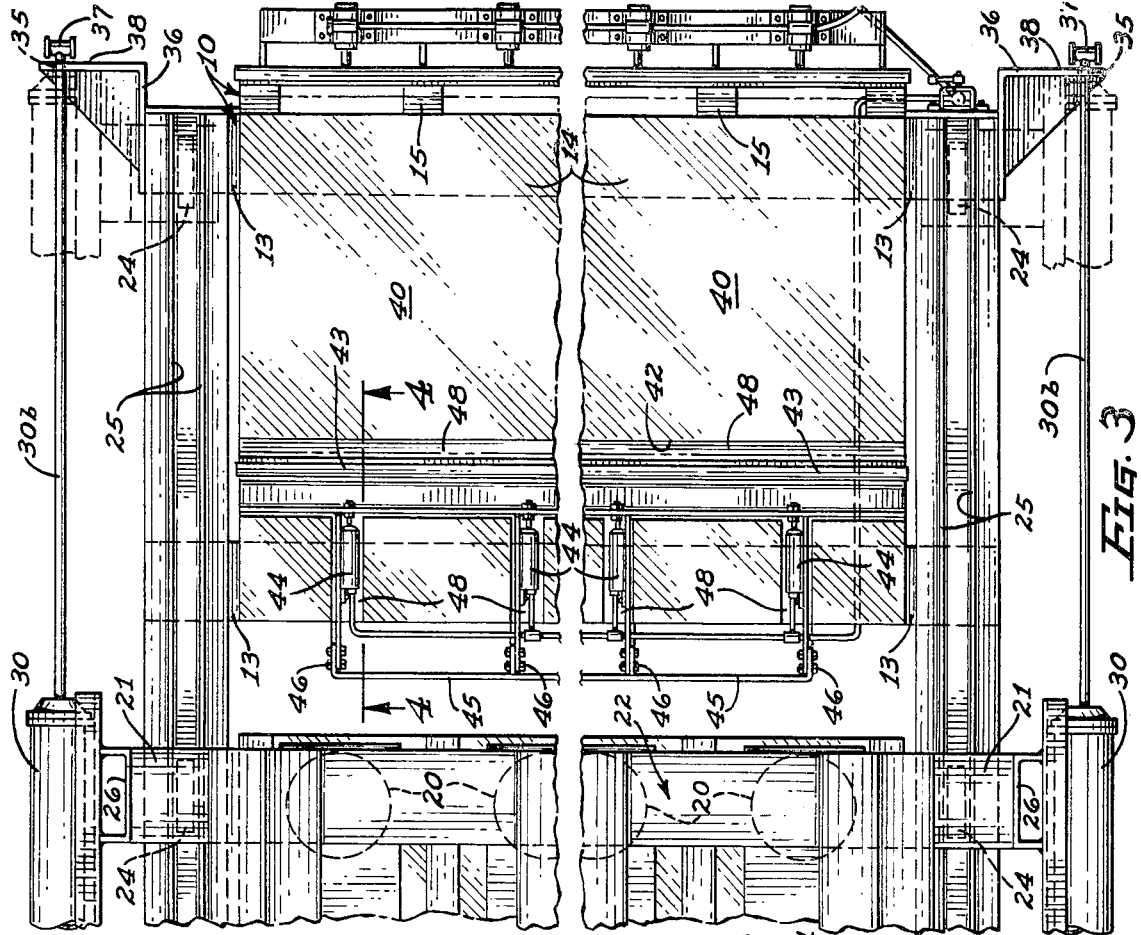
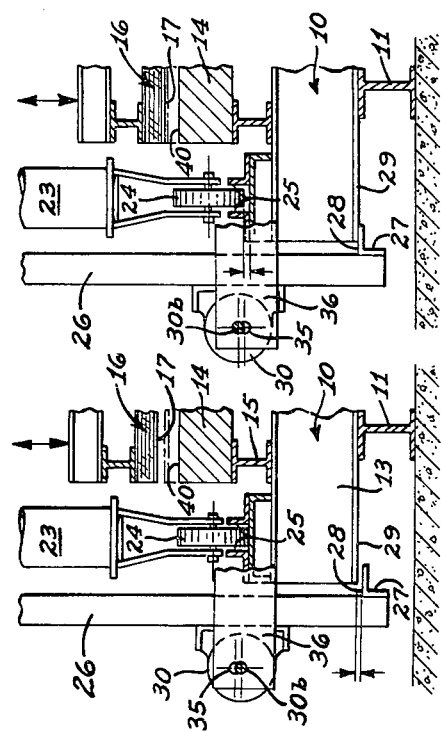
INVENTOR.
JOSEPH RUGEL.
BY Willard S. Browne
ATTORNEY.

3,511,175
PRESS STRUCTURE
Joseph Rugel, 445 S. Center, Mesa, Ariz. 85201
Filed Oct. 16, 1968, Ser. No. 768,104
Int. Cl. B27d *3/00;* B30b *1/34*
U.S. Cl. 100—226                    3 Claims

ABSTRACT OF THE DISCLOSURE

A press, particularly adapted to handling large sheets in laminating operations, in which the entire top H-frame structure is movable horizontally rearwardly to and from a position over the press bolster so as to facilitate handling the work relative to the press.

Background of the invention (1) The field of this invention lies in machine tools and is particularly directed to a laminating press in which the H-frame is movable horizontally relative to the press bolster so as to provide a clear opening for placement and removal of the large slabs of laminated workpiece.

(2) Heretofore, in laminating presses or any presses in which large flat workpieces are to be operated upon, great difficulty has been experienced in moving the work into and out of the press where the super structure or H-frame above the work supporting bolster was immovable. This has necessitated the shifting of the workpiece horizontally and feeding it and threading it into the daylight opening of the press and this becomes a serious problem where many sheets have to be handled in this manner and placed into the press for laminating process.

Summary of the invention

One of the objects of this invention is to provide a press in which the super structure or H-frame above the press bolster moves to one side horizontally of the press bolster so that it may be loaded and unloaded out in the open by the vertical lifting or positioning of workpieces on the bolster.

Another object of this invention is to proved an H-frame press in which the top super structure moves relatively horizontally to the bolster but which when moved over the bolster is interlocked with the bolster to form a complete H-frame unit capable of sustaining high pressing forces.

Still another object of this invention is to provide a laminating H-frame press structure having a traveling frame or carriage which automatically release itself from the press bolster when moved horizontally to or from operating position over the bolster, but which automatically interconnects itself with the bolster when pressure is applied from the H-frame traveling carriage against the work being operated upon.

It is also an object of this invention to provide means for extending and increasing the size of the press table for variations in the size of the work being operated upon.

Brief description of the drawings

FIG. 3 is an enlarged fragmentary plan view of the press structure shown in FIGS. 1 and 2.

FIG. 4 is an enlarged fragmentary sectional view on the line 4—4 of FIG. 3.

FIG. 5 is a diagrammatic fragmentary sectional view on the line 5—5 of FIG. 2 showing the relative position of the bolster and super structure frame when the frame is in retracted position.

FIG. 5a is a section similar to FIG. 5 showing the parts when the press is in operation applying force to the work on the press bolster.

Description of the preferred embodiment

Figure 1:
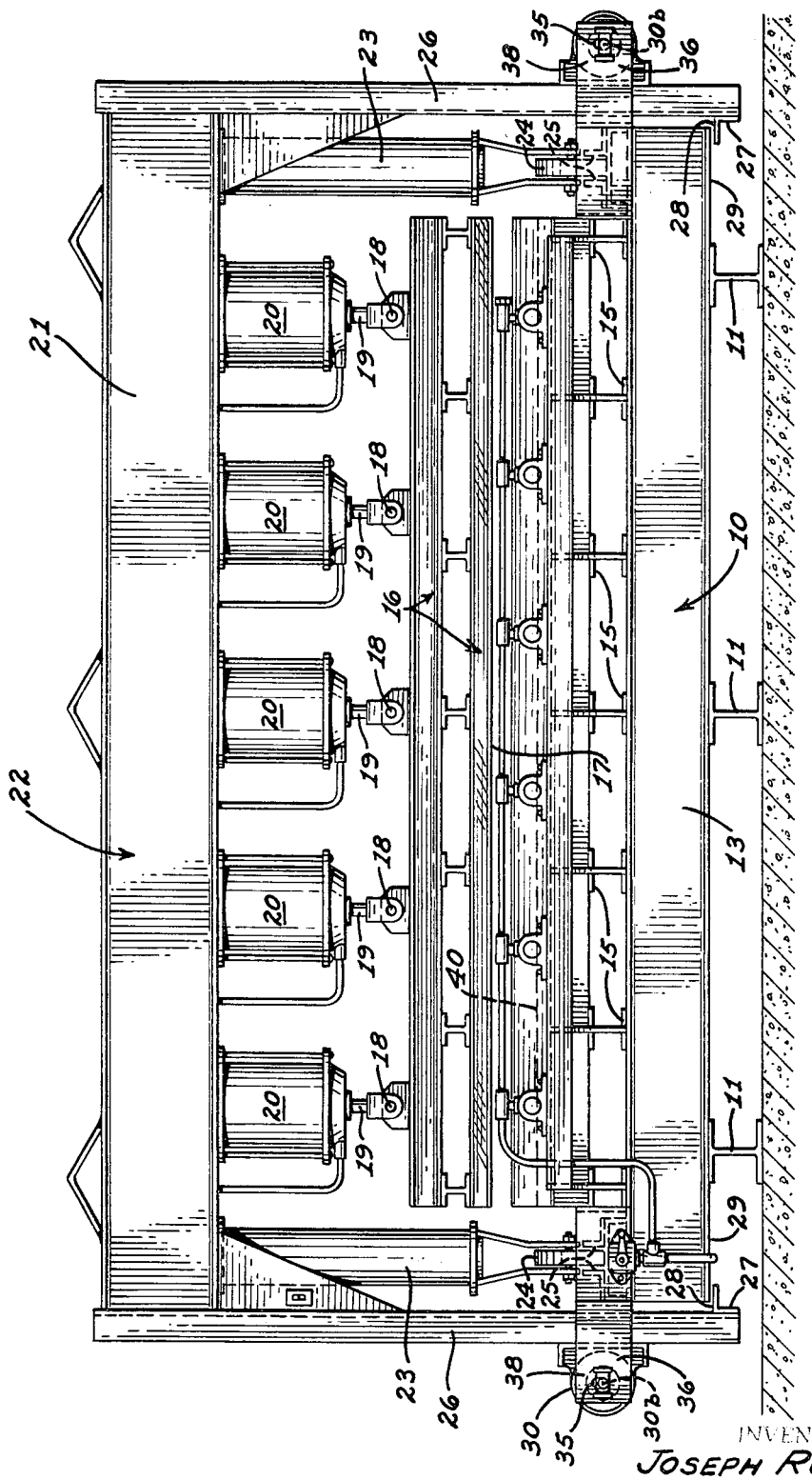
FIG. 1 is a front elevation of a press structure incorporating the features of this invention.

As an example of one embodiment of this invention, there is shown a press structure comprising the bolster frame indicated generally at 10 having a series of legs 11 supported on the floor 12. Work table support I-beams 13 are mounted on the legs 11 and the work table or bolster plate 14 is supported on transverse I-beams 15 on the top of the I-beams 13.

The press platen 16 having the work engaging lower surface 17 is supported by suitable pivotal connections 18 to the lower outer ends of the piston rods 19 of a series of fluid pressure cylinders 20 fixed to the underside of the traveling carriage beam structure 21 of the H-frame indicated generally at 22. At each end of the carriage beam structure 21 are fixed downwardly extending supports 23 on the lower ends of which are journaled rollers 24 which roll in and are guided in the transverse rearwardly extending guide rails 25 which are fixed on the end extensions of the I-beams 13. Also, fixed to the outer ends of the carriage beam structure 21 are the tension bars 26 which extend downwardly below the lower surface of the I-beams 13 and have tie members 27 fixed across their lower ends, the tie members having upwardly facing abutment surfaces 28 arranged to engage the under surface 29 of the table support I-beams 13.

H-frame shifting cylinders 30 are fixed to the lower portions of the tension bars 26 and have piston rods 30-*a* and 30-*b* extending out each end of the cylinders. The rear ends of the piston rods 30-*a* extend through the vertically elongated holes 31 formed in suitable brackets 32 fixed to the bolster frame 10 through the guide rails 25 supported by the pedestals 34 and I-beams 34-*a* on the floor 12. The front ends of the piston rods 30-*b* extend through vertically elongated holes 35 formed in the brackets 36 fixed to the ends of the bolster frame 10. Suitable jamb nuts 37 are provided on the outer ends of the piston rods 30-*a* and 30-*b* engaging the outer abutment faces 38 of the brackets 32 and 36 to confine the piston rods 30-*a* and 30-*b* against axial movement.

Figure 2:
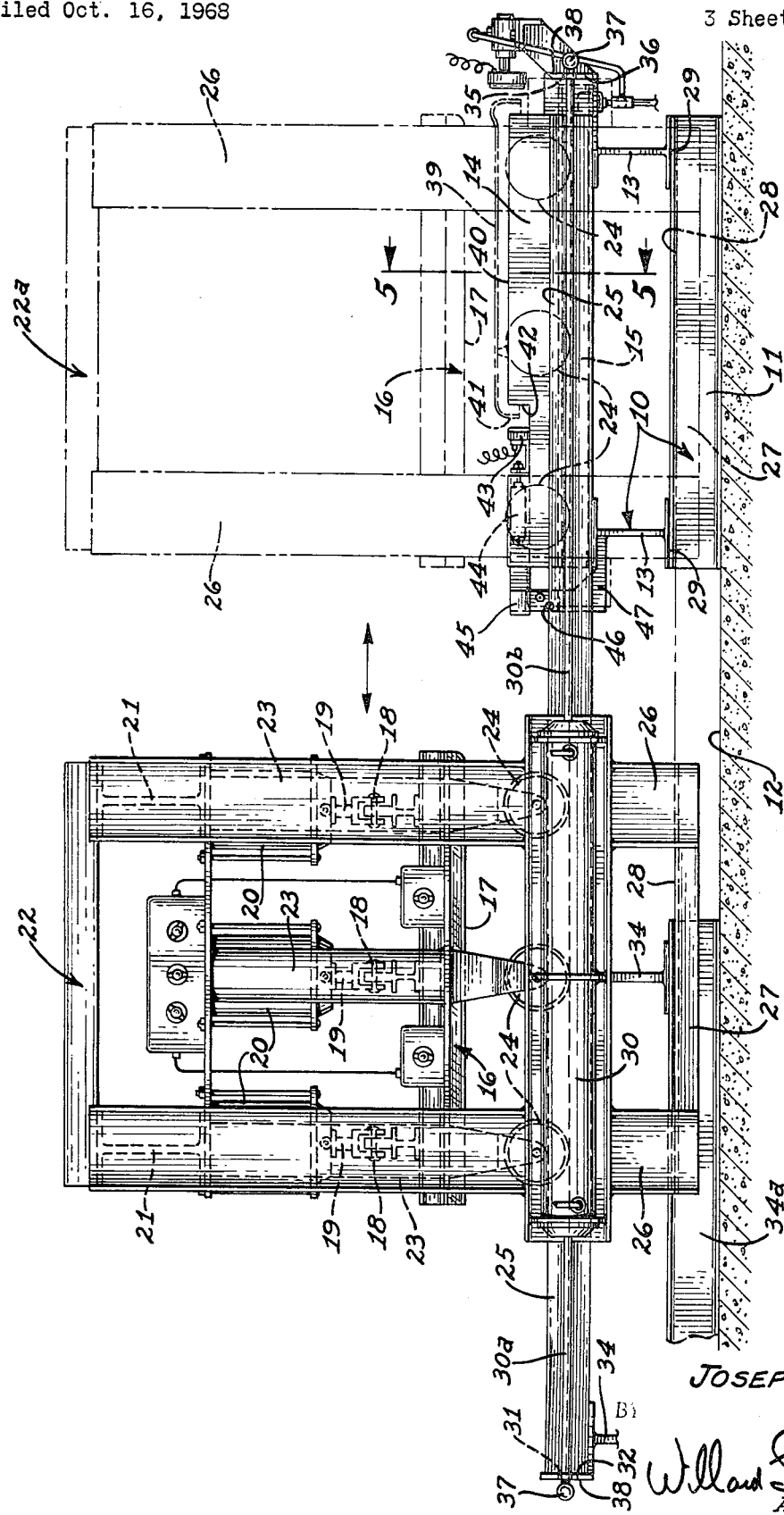
FIG. 2 is a left hand end elevation of the press structure shown in FIG. 1.

The workpiece lamination 39 is built up of a series of sheets placed on the work table surface 40 with the H-frame in the full line retracted position to the rear as shown in FIG. 2. The rear edge of the lamination 39 may be turned down at 41 and clamped against the vertical surface 42 of the work table 14 by a clamp rail 43 actuated by suitable fluid pressure cylinders 44 carried on the tilting frame 45 pivotally mounted at 46 on the brackets 47 fixed to the bolster frame 10. When the turned down edge 41 of the lamination is not required, and its is desired to increase the work surface 40 of the table 14, the frame 45 is swung back to the broken line position 45-*a* shown in FIG. 4 and filler slabs are inserted on the surfaces 48 and up against the vertical surface 42 of the bolster plate or work table 14.

With the work loaded on the work table, the fluid pressure cylinders 30 are energized to move the H-frame structure to the broken line position 22-*a* in FIG. 2 over the work table frame 10. Fluid pressure cylinders 20 are then energized to bring the platen surface 17 down on top of the workpiece lamination 39. When this occurs the H-frame structure 22 raises slightly upward until abutment surfaces 28 on the H-frame engages the abutment surfaces 29 of the bolster frame whereupon full pressure is then applied to the work by the cylinders 20.

After completing the pressing operation, the cylinders 20 are energized to retract the platen allowing the H-frame 22 to again draw slightly and rest on the rollers 24 whereupon cylinders 30 are energized to retract the H-frame to full line position shown in FIG. 2 for unloading and reloading the work table.

What is claimed is:

1. A press structure comprising in combination:
   (A) a bolster frame supported on a floor,
   (B) a work table fixed on the frame having an upwardly facing horizontal work supporting surface,
   (C) a platen having a downwardly facing horizontal work engaging surface above the work table,
   (D) an H-frame,
   (E) means for supporting the platen for vertical movement on the H-frame including,
   (F) power means interconnected between the H-frame and platen for vertically reciprocating the platen,
   (G) means for movably supporting the H-frame on the bolster frame for lateral horizontal movement to and from a position over the work table,
   (H) power means on the H-frame connected to the bolster frame energizible to reciprocate the H-frame laterally relative to the work table,
   (I) and an abutment means between the H-frame and the bolster frame arranged to limit vertical upward movement of the H-frame relative to the bolster frame.

2. A press structure as set forth in claim 1 wherein a limited lost motion is provided in the abutment means of Item I so as to allow the H-frame to be supported as in Item E when the platen is moved away from engagement with a workpiece on the work table and to allow the abutment means to engage while releasing the support in Item E when the platen is moved in engagement with the workpiece on the work table.

3. A press structure as set forth in claim 1 wherein the work table work support surface is provided with a longitudinally disposed recess and a clamp rail hinged to swing into or out of the recess for selectively providing a turned down edge workpiece clamp or additional work surface area for the work table surface.

References Cited

UNITED STATES PATENTS

| | | | |
|---|---|---|---|
| 3,204,506 | 9/1965 | Reinhold | 100—226 X |
| 3,463,080 | 8/1969 | Rodriguez. | |

FOREIGN PATENTS

| | | |
|---|---|---|
| 3,697 | 1883 | Great Britain. |

EDWARD L. ROBERTS, Primary Examiner

U.S. Cl. X.R.

100—269; 144—281; 156—580